(12) United States Patent
Koide

(10) Patent No.: US 7,333,157 B2
(45) Date of Patent: Feb. 19, 2008

(54) IMAGE DISPLAY DEVICE

(75) Inventor: Jun Koide, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/375,294

(22) Filed: Mar. 13, 2006

(65) Prior Publication Data

US 2006/0209219 A1    Sep. 21, 2006

(30) Foreign Application Priority Data

Mar. 16, 2005    (JP)    ............................. 2005-074668

(51) Int. Cl.
*G02F 1/1335* (2006.01)
*G02F 1/133* (2006.01)

(52) U.S. Cl. ............................................ 349/5; 349/33

(58) Field of Classification Search ............... 349/5, 349/8, 9, 33, 37; 353/99, 31, 34; 359/237, 359/242
See application file for complete search history.

(56) References Cited

U.S. PATENT DOCUMENTS 5,760,875 A * 6/1998 Daijogo et al. .............. 353/31

6,177,965 B1 * 1/2001 Takahara et al. ............. 349/5
6,854,851 B2 * 2/2005 Yamasaki et al. ............ 353/97
2004/0223121 A1   11/2004 Koide

FOREIGN PATENT DOCUMENTS

EP    1447993 A1    8/2004

* cited by examiner

*Primary Examiner*—Toan Ton
(74) *Attorney, Agent, or Firm*—Canon USA Inc IP Division

(57) ABSTRACT

At least one exemplary embodiment is directed to an image display device which includes: a first TN liquid crystal modulator for modulating the polarization state of first colored light; a second TN liquid crystal modulator for modulating the polarization state of second colored light; a third TN liquid crystal modulator for modulating the polarization state of third colored light; and an optical system for synthesizing the image light emitted from the three liquid crystal modulators; where a first voltage is applied to the first liquid crystal modulator for providing the first colored light with about half-wavelength phase difference; second voltage higher than the first voltage is applied to the second liquid crystal modulator for providing the second colored light with about half-wavelength phase difference; and third voltage higher than the second voltage is applied to the third liquid crystal modulator for providing the third colored light with about half-wavelength phase difference.

1 Claim, 9 Drawing Sheets

IMAGE DISPLAY DEVICE

BACKGROUND OF THE INVENTION

1. Field of the Invention

The present invention relates to an image display device, and specifically, though not exclusively, relates to image modulation using liquid crystal modulators.

2. Description of the Related Art

Hitherto, conventional liquid crystal modulators, such as two-dimensional pixel optical switches, that can serve as an image modulation device used in a projection-type image display device, and liquid crystal projectors using such liquid crystal modulators. Of the liquid crystal modulators used in a liquid crystal projector, there are so-called TN (Twisted Nematic) liquid crystal modulators for example. The TN liquid crystal modulators are a configuration where nematic liquid crystals, which have positive dielectric anisotropy, is sealed between a first transparent substrate having a transparent electrode and a second transparent substrate having transparent electrodes, wiring, and switching devices which form pixels. The major axis of liquid crystal molecules can be twisted 90 degrees continuously between the two transparent substrates.

Also, other than such transmissive liquid crystal modulators, there are reflective liquid crystal modulators which have a reflective mirror inside one of the substrates as a two-dimensional pixel optical switch.

Liquid crystal modulators use an ECB (Electrically Controlled Birefringence) effect, and are used to control the polarization state and form an image. Of these, the liquid crystal modulators generally used are those in TN mode operation, where the nematic liquid crystals of which dielectric anisotropy is positive are homogeneously aligned spirally, and where optical switching is performed with liquid crystal birefringence.

In the event that TN mode is used and modulation is controlled with the ECB effect, in a state where there is no voltage applied to a liquid crystal layer, the liquid crystal molecules which differ in refractive index in the diameter direction (minor axis direction) and the liquid crystal molecule major axis can be arranged in an approximately 90 degree twisted spiral on a plane which is roughly perpendicular to the thickness direction of the liquid crystal layer. Therefore the liquid crystal layer has birefringence as to a predetermined direction of the plane, applies retardation (optical path difference between two light fluxes with differing polarization direction) as to a light wave which transits through the liquid crystal layer, and effects change to the polarization of the light wave.

With a general liquid crystal modulator design, incident light is changed to a linearly polarized state with light wave polarization in a predetermined direction, by a polarization control device such as a polarizer. Then the obtained light wave is cast into the liquid crystal layer, and when the linearly polarized light which oscillates in this predetermined direction transits through the liquid crystal layer, only a half-wavelength of retardation is applied to the incident light wavelength (e.g., a center-wavelength in a given light wavelength band).

The light having transited through the liquid crystal layer has the oscillating direction changed to the direction at right angles with (perpendicular to) the oscillating direction of the linear polarization before the light being cast in, and the light is emitted.

After this, the polarization state is selected by the polarization control device positioned on the incidence side and by positioning a polarization control device such as the polarizer which is in a crossed Nichols arrangement on the emitting side, and the selected light transmits through the polarization control device.

With this design, when voltage is applied to the liquid crystal layer, using ECB effects, the liquid crystal molecules tilt the molecule major axis direction thereof in the thickness direction of the liquid crystal layer, and the amount of birefringence in the liquid crystal layer thickness direction is lessened. Thus, the light wave having transited the liquid crystal layer changes to an elliptic polarization state according to voltage applied to the liquid crystal layer. The light components where the oscillating direction is not orthogonally transformed are interrupted, by the polarization control device positioned on the light emitting side. Thus, the device is configured so that the intensity of the incident light is modulated.

The basic operation principles of the liquid crystal modulators will be described using FIG. 5 and FIG. 6.

FIG. 5 is an operation description diagram of a case of using a transmissive liquid crystal modulator. In FIG. 5, the light from a light source (not shown) becomes linearly polarized light LIW via a polarization selector such as a polarizer not shown, and is cast into a transmissive liquid crystal modulator 300 with the polarized light from the arrow IW direction at a 45 degree angle with the orientation direction of the liquid crystal of the transmissive liquid crystal modulator 300.

In this event, the incident light LIW divides the liquid crystal layer of the transmissive liquid crystal modulators 300 into two characteristic modes and is propagated. The emitted light LOW is emitted in the direction of the arrow OW in the diagram, with the retardation $\delta(\lambda)$ shown in the following Expression (1) between the two characteristic modes.

$$\delta(\lambda) = 2\pi(d \cdot \Delta n)/\lambda \qquad (1)$$

Here, $\lambda$ is the wavelength of the incident light LIW, d is the thickness of the liquid crystal layer, and $\Delta n$ is the refractive index anisotropy of the liquid crystal layer.

Next, the light LOW transits a polarization selecting device 301 such as a polarizer, which transmits linearly polarized light which is orthogonal to the polarization direction of the incident light LIW positioned on the emitting side. In this event, the transmissive liquid crystal modulators 300 are transmitted, and the amount of light transmitting the polarization selecting device 301, that is to say, the transmittance $T(\lambda)$ of the transmissive liquid crystal modulators 300 are as follows.

If the transmittance of the polarization selecting device 301 is 100% as to the linearly polarized light to be transmitted, and the aperture ratio of the transmissive liquid crystal modulator 300 is 100%, and the non-polarized transmittance is 100%, then the transmittance $T(\lambda)$ of the light LMW emitted in the MW arrow direction in the diagram which transits the polarization selecting device 301 as to the phase difference $\delta(\lambda)$ is expressed by $$T(\lambda) = 0.5(1 - \cos(\delta(\lambda))) \qquad (2)$$

The transmittance of the liquid crystal modulators hereafter refers to the ratio of amount of light which transits the polarization selector 301 to the amount of light of the linearly polarized light cast into the liquid crystal modulators 300, via the polarization selectors as expressed in Expression (2).

When voltage is applied to the liquid crystal layer, the liquid crystal molecules move in the direction from parallel to perpendicular as to the sandwiched substrate of the liquid crystal layer, and thus the refractive index anisotropy Δn appears to be reduced. Therefore the retardation δ(λ) is reduced, and when δ=0 the transmittance T=0, and a black display is realized.

On the other hand, with no voltage applied, the refractive index anisotropy Δn is at its greatest, and if the liquid crystal layer thickness d and the refractive index anisotropy Δn of the liquid crystal layer is determined such that d·Δn=λ/2, then δ(λ)=π, the transmittance is T=1, and the display is brightest.

FIG. 6 is an operation description diagram using reflective liquid crystal modulators. In FIG. 6, the light LIW from the light source is cast into the polarizing beam splitter 401 from the IW arrow direction in the diagram, the light LIWB of the P components transit the polarizing selector film 401a in the IWB arrow direction in the diagram, and the light LIWA of the S components are reflected and deflected in the IWA arrow direction in the diagram. The light component LIWA of the arrow IWA includes the light selected which is linearly polarized in the vertical direction in the diagram.

The liquid crystal orientation direction of the reflective liquid crystal modulators 400 is tilted at a 45 degree angle as to the linearly polarized direction of the light LIWA. The light LIWA cast into the reflective liquid crystal modulators 400 from the IWA arrow direction divides the liquid crystal layer of the reflective liquid crystal modulators 400 into two characteristic modes that are propagated. Then when the light LOW is reflected and emitted in the direction of the arrow OW in the diagram. The light LOW is emitted with the retardation δ(λ) between the two modes, expressed in the following Expression (3).

$$\delta(\lambda)=2\pi(2d\cdot\Delta n)/\lambda \qquad (3)$$

Here, λ is the wavelength of the incident light, d is the thickness of the liquid crystal layer, and Δn is the refractive index anisotropy Δn of the liquid crystal layer.

Then, the light LOW emitted in the OW arrow direction in the diagram, the light LBW of the vertical direction component (S-polarization component as to the polarizing beam splitter 401) is reflected in the BW arrow direction in the diagram by the polarization separation plane 401a and returns to the light source side, and the light LMW of the parallel direction component (P-polarization component as to the polarizing beam splitter 401) is transmitted in the MW arrow direction in the diagram by the polarization separation plane 401a. The amount of light which reflects from the reflective liquid crystal modulators 400 and transmits through the polarizing beam splitter 401, that is to say, the reflectivity R(λ) of the reflective liquid crystal modulators 400 can be expressed as follows. If the S-polarizing reflectivity of the polarizing beam splitter 401 is 100%, the P-polarizing transmittance is 100%, and the aperture ratio of the reflective liquid crystal modulators 400 is 100% and the non-polarizing reflectivity is 100%, then the reflectivity (light transfer rate) R(λ) emitted in the MW arrow direction in the diagram as to the retardation δ(λ) is expressed as $$R(\lambda)=0.5(1-\cos\delta(\lambda))) \qquad (4)$$

The reflectivity of the reflective liquid crystal modulators refers to the ratio of amount of light which transits the polarizing beam splitter 401 as to the amount of light of the linearly polarized light cast into the liquid crystal modulators 400, via the polarizing beam splitter 401a as expressed in Expression (4).

When voltage is applied to the liquid crystal layer, the liquid crystal molecules move in the direction from parallel to perpendicular as to the sandwiched substrate of the liquid crystal layer, and thus the refractive index anisotropy Δn appears to be reduced. Therefore the retardation δ(λ) is reduced, and when δ=0 the reflectivity R=0, and display becomes black.

On the other hand, with no voltage applied, the refractive index anisotropy Δn is at its greatest, and if the liquid crystal layer thickness d and the refractive index anisotropy Δn is determined so that 2d·Δn=λ/2, then δ(λ)=π, the reflectivity is R=1, and the display is clearest.

With the liquid crystal modulators which perform modulation control using the ECB effect control in this TN mode, there are restrictions regarding the light wavelength λ and amount of applied retardation which indicates the absolute amount of the length not dependent on the light wavelength of the retardation δ. According to the principles described above, it is apparent that the phase difference δ is an amount dependent on the wavelength. In other words, the wavelength band of the incident light of the three primary colors each have a wavelength band of R, G, B (red, green, blue), and the wavelength band has a width of slightly less than 100 nm.

Therefore, the TN-type liquid crystal modulators designed with a predetermined standard are configured so as to apply retardation of only a half-wavelength as to the predetermined wavelength light in a state with no voltage being applied to the liquid crystal layer. Thus, with the wavelength band of slightly less than 100 nm corresponding to each color, it is inevitable that retardation of greater than a half-wavelength can be applied, or retardation of less than a half-wavelength can be applied.

One more related restriction is that, because the TN mode is used, the birefringence of the liquid crystal layer is greatest when no voltage is being applied to the liquid crystal layer, and while the amount of retardation can be controlled in the direction of lessening by the ECB effect control, the opposite direction of increasing the amount of retardation is impossible.

On the other hand, a mainstream configuration is a full-color display type projection display device (color projector) which can use a liquid crystal modulator as a two-dimensional pixel optical switch which modulates the colored lights RGB (red, green, blue) which are the three primary colors of the additive color-mixing display as individual two-dimensional images, regardless of the transmissive liquid crystal modulators or reflective liquid crystal modulators, and after this, the full-color image is displayed using light-synthesizing means. This color project has a configuration of using three liquid crystal modulators, for modulating each of the R, G, and B light.

A color projector using such three liquid crystal display devices has been described in EP1447993A1.

SUMMARY OF THE INVENTION

At least one exemplary embodiment is directed to an image-display device, where a modulated image is generated by polarizing an image pattern with liquid crystal modulators, converting this to an intensity modulated image with a polarization selecting device which selects a polarization state, and enlarging and projecting this onto a projection object.

Accordingly, At least one exemplary embodiment is directed to an image display device which can prevent color balance distortion or light falloff, or lessen the degree thereof, by having the applied retardation from the liquid crystal modulators in a state with no voltage applied to differ for each color of the RGB (this is not restricted to the three colors RGB, but can be applied to a configuration where four or more colors are synthesized).

A first exemplary embodiment is directed to an image display device which includes: a first TN liquid crystal modulator for modulating the polarization state of a first colored light; a second TN liquid crystal modulator for modulating the polarization state of a second colored light which has a shorter wavelength than the first colored light; a third TN liquid crystal modulator for modulating the polarization state of a third colored light which has a shorter wavelength than the second colored light; and an optical system for synthesizing the image light which is emitted from the three liquid crystal modulators; where a first voltage is applied to the first liquid crystal modulator for half-wavelength retardation of the first colored light; a second voltage which is higher than the first voltage is applied to the second liquid crystal modulator for half-wavelength retardation of the second colored light; a third voltage which is higher than the second voltage is applied to the third liquid crystal modulator for half-wavelength retardation of the third colored light.

A second exemplary embodiment is directed to an image display device which includes: a first TN liquid crystal modulator for modulating the polarization state of a first colored light; a second TN liquid crystal modulator for modulating the polarization state of a second colored light which has a shorter wavelength than the first colored light; a third TN liquid crystal modulator for modulating the polarization state of a third colored light which has a shorter wavelength than the second colored light; and an optical system for synthesizing the image light which is emitted from the three liquid crystal modulators; where the retardation which the second liquid crystal modulator applies to the second colored light without applying voltage is greater than the retardation which the first liquid crystal modulator applies to the first colored light without applying voltage; and the retardation which the third liquid crystal modulator applies to the third colored light without applying voltage is greater than the retardation which the second liquid crystal modulator applies to the second colored light without applying voltage.

A third exemplary embodiment is directed to an image display device which includes: a first TN liquid crystal modulator for modulating the polarization state of a first colored light; a second TN liquid crystal modulator for modulating the polarization state of a second colored light which has a shorter wavelength than the first colored light; a third TN liquid crystal modulator for modulating the polarization state of a third colored light which has a shorter wavelength than the second colored light; and an optical system for synthesizing the image light which is emitted from the three liquid crystal modulators; where the retardation which the first liquid crystal modulator applies to the first colored light without applying voltage is about the same as the retardation which the second liquid crystal modulator applies to the first colored light without applying voltage; and the retardation which the first and second liquid crystal modulator applies to the first colored light without applying voltage is greater than the retardation which the third liquid crystal modulator applies to the first colored light without applying voltage.

A fourth exemplary embodiment is directed to an image display device which includes: a first TN liquid crystal modulator for modulating the polarization state of a first colored light; a second TN liquid crystal modulator for modulating the polarization state of a second colored light which has a shorter wavelength than the first colored light; a third TN liquid crystal modulator for modulating the polarization state of a third colored light which has a shorter wavelength than the second colored light; and an optical system for synthesizing the image light which is emitted from the three liquid crystal modulators; where the retardation which the first liquid crystal modulator applies to the first colored light without applying voltage is greater than the retardation which the second liquid crystal modulator applies to the first colored light without applying voltage; and the retardation which the second liquid crystal modulator applies to the first colored light without applying voltage is about the same as the retardation which the third liquid crystal modulator applies to the first colored light without applying voltage.

A fifth exemplary embodiment is directed to an image display device which includes: a first TN liquid crystal modulator for modulating the polarization state of a first colored light; a second TN liquid crystal modulator for modulating the polarization state of a second colored light which has a shorter wavelength than the first colored light; a third TN liquid crystal modulator for modulating the polarization state of a third colored light which has a shorter wavelength than the second colored light; and an optical system for synthesizing the image light which is emitted from the three liquid crystal modulators; where a first voltage is applied to the first liquid crystal modulator for half-wavelength retardation of the first colored light; a second voltage which is lower than the first voltage is applied to the second liquid crystal modulator for half-wavelength retardation of the second colored light; a third voltage which is lower than the second voltage is applied to the third liquid crystal modulator for half-wavelength retardation of the third colored light.

A sixth exemplary embodiment is directed to an image display device which includes: a first TN liquid crystal modulator for modulating the polarization state of a first colored light; a second TN liquid crystal modulator for modulating the polarization state of a second colored light which has a shorter wavelength than the first colored light; a third TN liquid crystal modulator for modulating the polarization state of a third colored light which has a shorter wavelength than the second colored light; and an optical system for synthesizing the image light which is emitted from the three liquid crystal modulators; where the retardation which the second liquid crystal modulator applies to the second colored light without applying voltage is less than the retardation which the first liquid crystal modulator applies to the first colored light without applying voltage; and the retardation which the third liquid crystal modulator applies to the third colored light without applying voltage is less than the retardation which the second liquid crystal modulator applies to the second colored light without applying voltage.

A seventh exemplary embodiment is directed to an image display device which includes: a first TN liquid crystal modulator for modulating the polarization state of a first colored light; a second TN liquid crystal modulator for modulating the polarization state of a second colored light which has a shorter wavelength than the first colored light; a third TN liquid crystal modulator for modulating the polarization state of a third colored light which has a shorter wavelength than the second colored light; and an optical system for synthesizing the image light which is emitted from the three liquid crystal modulators; where the retardation which the first liquid crystal modulator applies to the first colored light without applying voltage is about the same as the retardation which the second liquid crystal modulator applies to the first colored light without applying voltage; and the retardation which the first and second liquid crystal modulator applies to the first colored light without applying voltage is less than the retardation which the third liquid crystal modulator applies to the first colored light without applying voltage.

An eighth exemplary embodiment is directed to an image display device which includes: a first TN liquid crystal modulator for modulating the polarization state of a first colored light; a second TN liquid crystal modulator for modulating the polarization state of a second colored light which has a shorter wavelength than the first colored light; a third TN liquid crystal modulator for modulating the polarization state of a third colored light which has a shorter wavelength than the second colored light; and an optical system for synthesizing the image light which is emitted from the three liquid crystal modulators; where the retardation which the first liquid crystal modulator applies to the first colored light without applying voltage is less than the retardation which the second liquid crystal modulator applies to the first colored light without applying voltage; and the retardation which the second liquid crystal modulator applies to the first colored light without applying voltage is about the same as the retardation which the third liquid crystal modulator applies to the first colored light without applying voltage.

A ninth exemplary embodiment is directed to an image display device which includes: a first TN liquid crystal modulator for modulating the polarization state of a first colored light; a second TN liquid crystal modulator for modulating the polarization state of a second colored light which has a shorter wavelength than the first colored light; a third TN liquid crystal modulator for modulating the polarization state of a third colored light which has a shorter wavelength than the second colored light; and an optical system for synthesizing the image light which is emitted from the three liquid crystal modulators; where in a state where the same voltage is applied to the three liquid crystal modulators, the three liquid crystal modulators are configured to apply the same retardation as to light of the same wavelength; the amount of retardation at the time there is no voltage applied to the three liquid crystal modulators equates to a half-wavelength of approximate center wavelength of the first colored light; the second and third liquid crystal modulators apply retardation equivalent to a half-wavelength of approximate center wavelength of the second and third colored lights, by applying a predetermined voltage on each of the liquid crystal modulators.

A tenth exemplary embodiment is directed to an image display device which includes: a first TN liquid crystal modulator for modulating the polarization state of a first colored light; a second TN liquid crystal modulator for modulating the polarization state of a second colored light which has a shorter wavelength than the first colored light; a third TN liquid crystal modulator for modulating the polarization state of a third colored light which has a shorter wavelength than the second colored light; and an optical system for synthesizing the image light which is emitted from the three liquid crystal modulators; where in a state where a predetermined voltage is applied, the first and second liquid crystal modulators are configured to apply the same predetermined retardation as to light of a predetermined wavelength; and in the state where the predetermined voltage is applied, the retardation which the third liquid crystal modulator applies as to light of the predetermined wavelength differs from the predetermined retardation; the amount of retardation at the time there is no voltage applied to the first liquid crystal modulator equates to a half-wavelength of approximate center wavelength of the first colored light; the amount of retardation at the time there is no voltage applied to the third liquid crystal modulator equates to a half-wavelength of approximate center wavelength of the third colored light; and in order to apply the retardation equating to a half-wavelength of approximate center wavelength of the second colored light, a voltage greater than 0 (zero) is applied to the second liquid crystal modulator.

An eleventh exemplary embodiment is directed to an image display device which includes: a first TN liquid crystal modulator for modulating the polarization state of a first colored light; a second TN liquid crystal modulator for modulating the polarization state of a second colored light which has a shorter wavelength than the first colored light; a third TN liquid crystal modulator for modulating the polarization state of a third colored light which has a shorter wavelength than the second colored light; and an optical system for synthesizing the image light which is emitted from the three liquid crystal modulators; where in a state where a predetermined voltage is applied, the second and third liquid crystal modulators are configured to apply the same predetermined retardation as to light of a predetermined wavelength; and in the state where the predetermined voltage is applied, the retardation which the first liquid crystal modulator applies as to light of the predetermined wavelength differs from the predetermined retardation; the amount of retardation at the time there is no voltage applied to the first liquid crystal modulator equates to a half-wavelength of approximate center wavelength of the first colored light; the amount of retardation at the time there is no voltage applied to the second liquid crystal modulator equates to a half-wavelength of approximate center wavelength of the second colored light; and in order to apply the retardation equating to a half-wavelength of approximate center wavelength of the third colored light, a voltage greater than 0 (zero) is applied to the third liquid crystal modulator.

Further features of the present invention will become apparent from the following description of exemplary embodiments with reference to the attached drawings.

DESCRIPTION OF THE EMBODIMENTS

Figure 1:
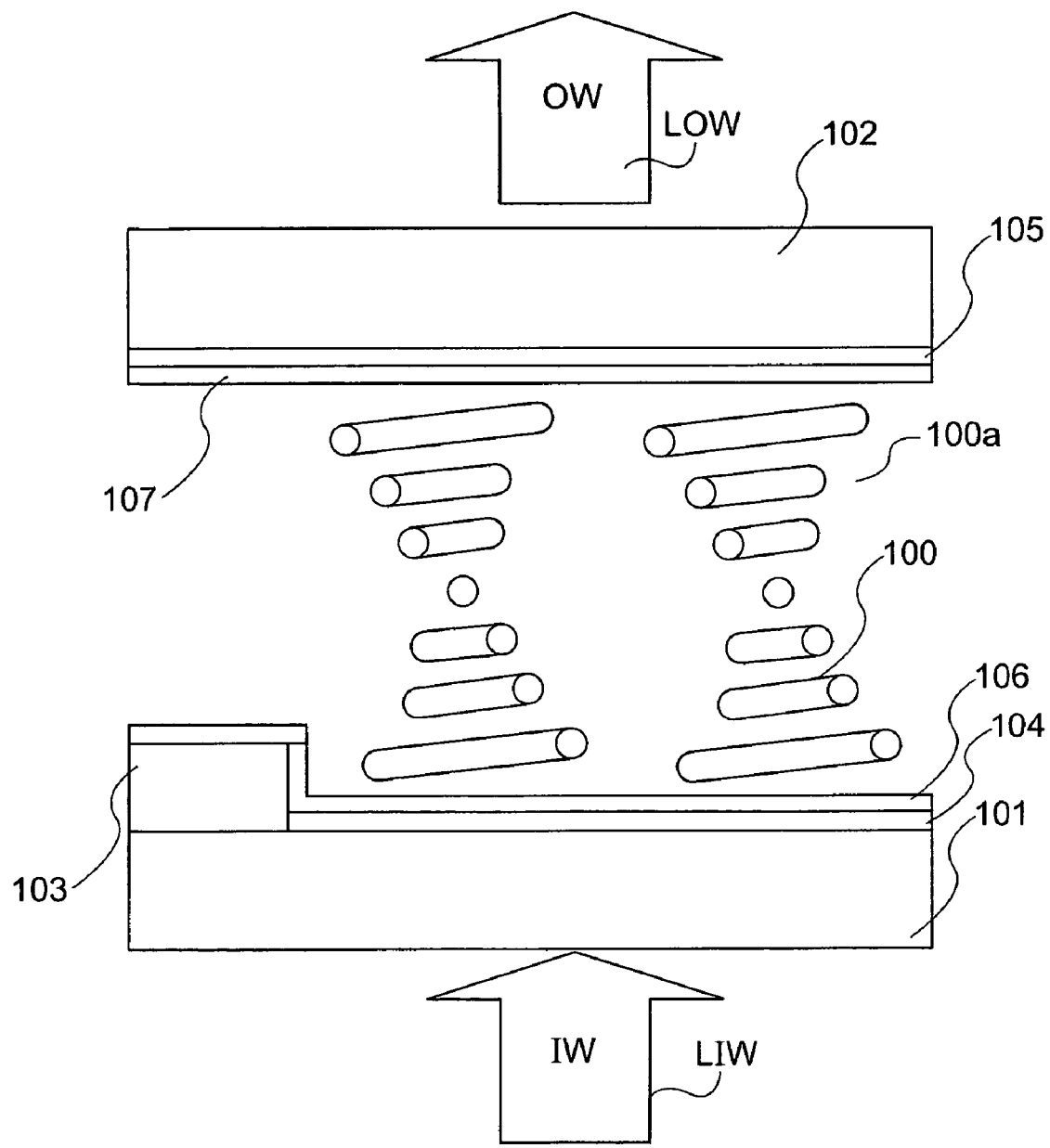
FIG. 1 is a schematic diagram for describing a drive state of a transmissive liquid crystal modulator according to an exemplary embodiment of the present invention.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of liquid crystal modulators.

In all of the examples illustrated and discussed herein any specific values, for example phase differences. Thus, other examples of the exemplary embodiments could have different values.

Notice that similar reference numerals and letters refer to similar items in the following figures, and thus once an item is defined in one figure, it may not be discussed for following figures.

With the present exemplary embodiment, a method/device is discussed for facilitating the improvement of color balance distortion (light falloff of a specific color) or light falloff, or for lessening the degree of color balance distortion or light falloff, in the event that the same liquid crystal modulators are used for the 3 colors RGB.

Here, liquid crystal modulators which are conventionally configured to be the same can be used as modulators of each RGB-color light, and when retardation of half wavelength is applied to the light wavelength in the proximity of the center-of-gravity wavelength (center wavelength of a waveband) of the green color (G) which has the highest visibility feature (easiest for the human eye to see). In other words, when retardation of a substantial portion (e.g., all) of the liquid crystal modulators are designed to match the light of the wavelength, which can have the highest visibility, the following problems can occur. For example, an appropriate amount of retardation (half wavelength here) can be applied to the G (green) colored light, but even for the R (red) colored light the retardation amount applied becomes less than half wavelength even in a state without voltage applied, and this results in the R (red) color in the image displayed having light falloff.

Thus, the following solution can be considered. For an image display device (liquid crystal display device), liquid crystal modulators specific to each color are prepared as liquid crystal modulators which modulate each RGB-color, and the retardation amount to be applied to each color light liquid crystal modulator is appropriately set. However, in this case, liquid crystal modulators which have different specifications for each RGB-color must be manufactured, and therefore the manufacturing process can become a major issue.

Therefore, with the present exemplary embodiment, a device configured as a liquid crystal display device for G (green) wavelength use, is positioned in the G-color light path and the B-color light path. Thus configured, voltage applied to the liquid crystal layer of the liquid crystal modulators positioned in the B-color light path can be adjusted (here, the voltage applied to the liquid crystal modulators positioned in the B-color light path can be higher than the voltage applied to the liquid crystal modulators positioned in the G-color light path), and by doing so, the brightness of the B (blue) color is adjusted. Thus, the G-color and the B-color can obtain the appropriate amount of light. Additionally, the liquid crystal modulators to be positioned in the R-color light path can be liquid crystal modulators which differ from the liquid crystal modulators positioned together in the G-color light path and the B-color light path as described above. In other words, by liquid crystal modulators which have appropriately set retardation amounts to be applied to the R-color light, that is to say, liquid crystal modulators such that the retardation amount applied to the center-of-gravity wavelength of R-color light is half wavelength with no voltage applied, being positioned in the R-color light path, the R-color light in the colored image can be set to the appropriate brightness.

In other words, with the present exemplary embodiment, a liquid crystal display device will be specifically described which can display an image with little loss of R-color light (and/or B-color light) as compared to the case where the same liquid crystal modulators can be positioned in the light paths of a substantial portion (e.g., all) of the RGB-color light, and a substantial portion (e.g., all) of the liquid crystal modulators can be controlled in the same way matching the center-of-gravity wavelength of G-color light.

The drive control of the liquid crystal modulators used in the liquid crystal display device of the present exemplary embodiment will be described below with reference to FIG. 1 through FIG. 4.

The present exemplary embodiment can use, for example, TN (Twisted Nematic) mode action liquid crystal modulators with positive nematic phase. These are liquid crystal modulators where the refractive index in the major axis direction of the liquid crystal molecules is greater than the refractive index of the diameter direction (rectangular direction). The liquid crystal modulators in TN mode (or TN-type) are configured to apply only a half wavelength of retardation to a predetermined wavelength of light in a state where voltage is not applied to the liquid crystal layer.

Figure 2:
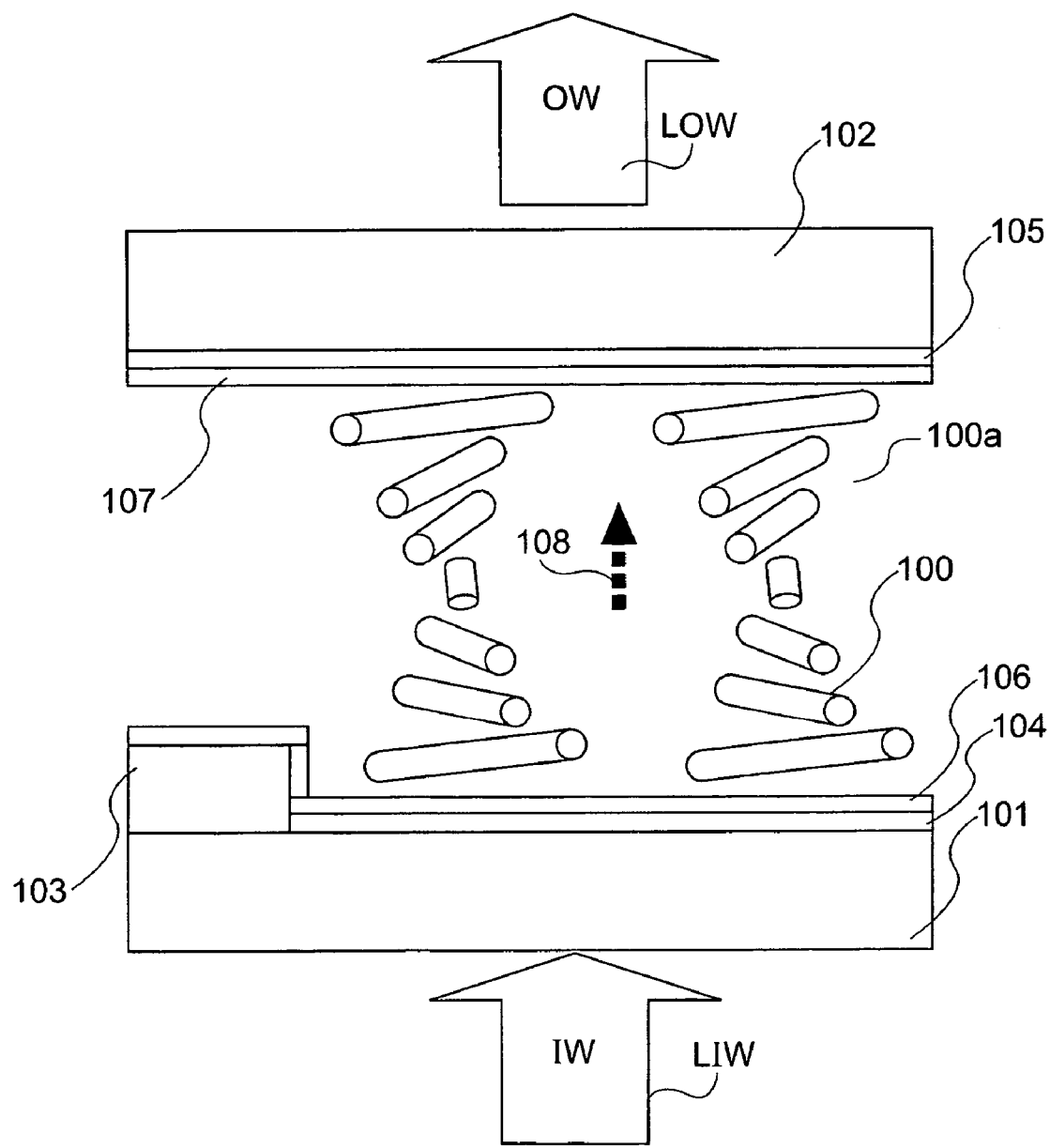
FIG. 2 is a schematic diagram for describing a drive state of a transmissive liquid crystal modulator according to the exemplary embodiment.

FIG. 1 is model diagram of the state of a liquid crystal layer, using a transmissive liquid crystal modulator in TN mode, without voltage being applied, and FIG. 2 is a model diagram of the state of a liquid crystal layer, using a transmissive liquid crystal modulator in TN mode, with a predetermined amount of voltage being applied.

The transmissive liquid crystal modulator comprises a transparent substrate 101, a facing transparent substrate 102, and a liquid crystal layer 100a which contains liquid crystal molecules 100 sealed in between these two substrates.

The transparent substrate 101 comprises a transparent pixel electrode 104 arranged in a matrix of rows and columns not shown, for example formed of an ITO (indium tin oxide), a liquid crystal oriented film 106 formed of for example a polyimide polymer, a switching device 103 for electrically driving the pixel electrode 104, and wiring not shown, and the pixel electrode 104 is configured so as to be individually driven electrically.

Also, the facing transparent substrate 102 can be formed of a transparent common electrode 105 formed from for example an ITO (indium tin oxide), and a liquid crystal oriented film 107 formed of for example a polyimide polymer.

Next, the operation of the transmissive liquid crystal modulator will be described. In FIG. 1, the light LIW from the light source is cast in the direction of the arrow IW in the diagram as linear polarization with the polarization direction being a 45 degree angle from the oriented direction of the substrate boundary of the liquid crystal molecules 100, via a polarization selecting device not shown. The incident light LIW is divided into two characteristic modes and propagates and transits the liquid crystal layer 100a, and is emitted in the direction of the arrow OW in the diagram as light LOW.

At this time, retardation Δ is generated between the two modes in the liquid crystal layer 100a, which is expressed by the following Expression.

$$\Delta = d \cdot \Delta n \quad (5)$$

In the Expression (5), d is the thickness of the liquid crystal layer 100a, and Δn is the refractive index anisotropy of the liquid crystal layer.

Thus the transmittance T(λ) of the light with components which are orthogonal to the linear polarization of the incident light LIW to be cast into the transmissive liquid crystal modulator is as follows. If the aperture ratio of the transmissive liquid crystal modulator is 100% and the non-polarized transmittance is 100%, then the light transmittance T(λ) when the light is emitted in the direction of the arrow OW as to the retardation Δ is $$T(\lambda) = 0.5(1 - \cos(2\pi\Delta/\lambda)) \quad (6)$$

where λ is the wavelength of the incident light.

In other words, the transmittance T(λ) is dependent on the wavelength of the incident light λ and the retardation Δ which the liquid crystal devices themselves apply. When the retardation Δ is λ/2, then T(λ)=1, and transmittance is greatest, and the state in which the retardation Δ does not apply voltage to the liquid crystals, that is to say the situation in FIG. 1 is greatest, and retardation Δ cannot be increased further.

FIG. 2 illustrates the state in FIG. 1 with a situation where the electrical field of the dotted line arrow 108 in the diagram is applied between the transparent electrodes 104 and 105.

The liquid crystal molecules 100 are in a state of being slightly tilted in the direction of the liquid crystal layer thickness due to application of an electric field. By tilting the major axis direction having the molecule refractive index anisotropy of the liquid crystal molecules 100 towards the light transmitting direction, the apparent refractive index anisotropy Δn can be reduced with respect to a horizontal wave.

In other words, by applying voltage to the liquid crystal, the state in FIG. 2 shows a state where the retardation Δ expressed in Expression (5) is decreased compared to the state in FIG. 1.

Figure 7:
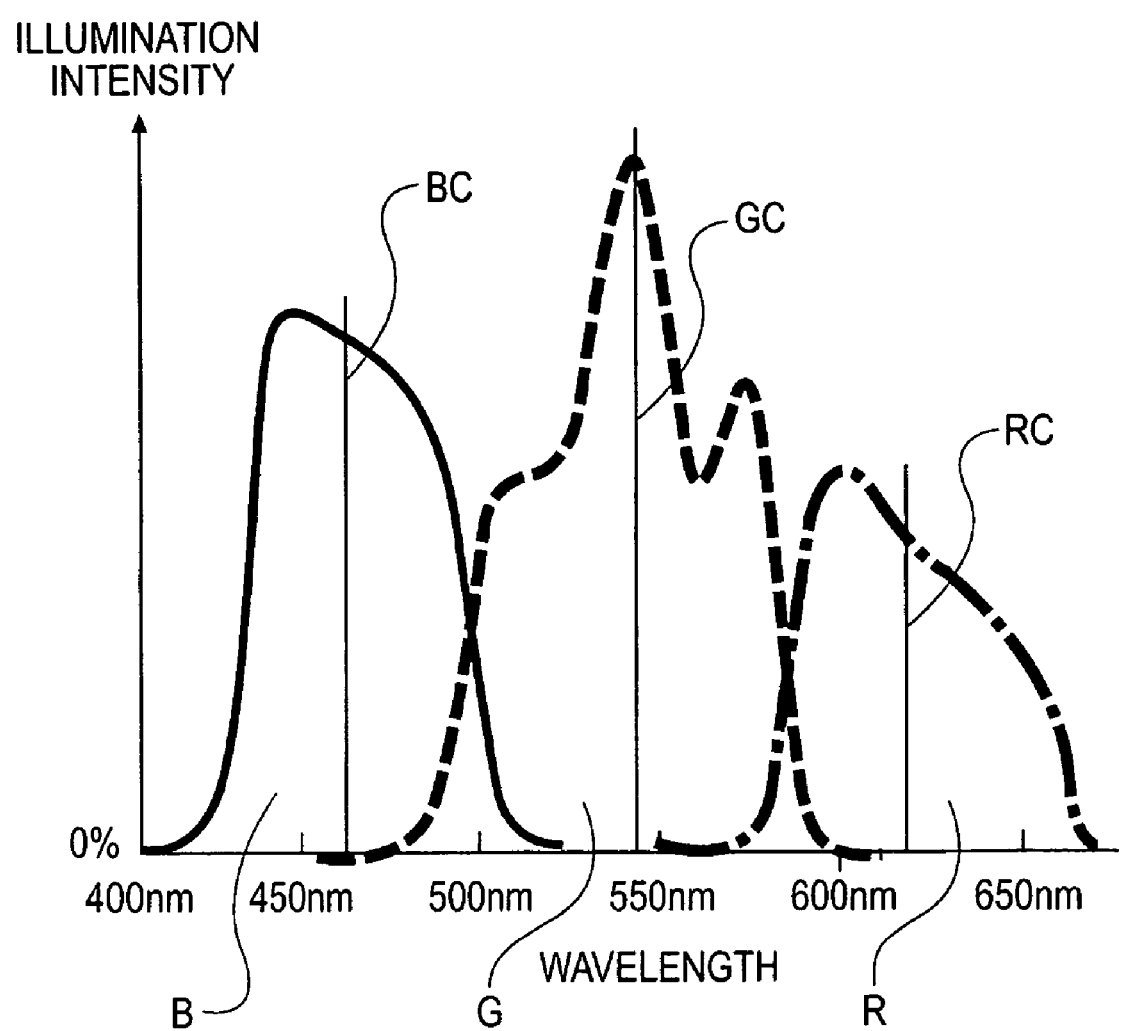
FIG. 7 is a diagram illustrating light wavelength distribution of the light incident to the liquid crystal modulators.

On the other hand, the light spectrum which breaks out the three primary colors (RGB-colors) and illuminates the liquid crystal modulators is broken out into the R-color (solid line), G-color (dotted line), and B-color (broken line) as illustrated in FIG. 7, when using an ultra high pressure mercury lamp for a light source, for example.

The center-of-gravity wavelength (center wavelength) of the wavelength band for each color is RC for the R-color, GC for the G-color, and BC for the B-color.

Here the center-of-gravity wavelength λ0 refers to the wavelength of the horizontal axis (wavelength) of the center-of-gravity of the area enclosed by the curved lines of the wavelength band for each color light in FIG. 7. Alternatively, a representative wavelength for each color can simply be selected and these can be used as the center-of-gravity wavelength described above.

In the state shown in FIG. 1 where voltage is not applied to the liquid crystal, the liquid crystal modulators are configured in the thickness d of the liquid crystal layer 100a and the refractive index anisotropy Δn of the liquid crystal layer 100a so as to apply retardation of ΔR=RC/2=d·Δn of half wavelength (e.g., within the range of plus or minus 5%) as to the wavelength of the center-of-gravity wavelength RC in the R-color wavelength range which has the longest wavelength among the three primary colors. Then, the liquid crystal modulators (liquid crystal panel) for R-color modulation performs modulation to the R-color light by adjusting the applied voltage for each pixel within the range from the state of no voltage applied (that is to say, the state of applying retardation of an approximate half wavelength to the R-color light) to the state where voltage is applied so that the refractive index anisotropy Δn becomes almost 0.

Modulation of the G-color light is performed on the G-color modulation liquid crystal panel, as illustrated in FIG. 7, by adjusting the applied voltage for each pixel within the range of the state where only enough voltage is applied to the liquid crystal for the retardation Δ to be half wavelength (e.g., within the range of plus or minus 5%) as to the center-of-gravity wavelength GC of the G-color wavelength band (applied voltage EG), to the state where voltage is applied so that the refractive index anisotropy Δn becomes almost 0 (applied voltage EGO).

Further, modulation of the B-color light is performed on the B-color modulation liquid crystal panel, by adjusting the applied voltage for each pixel within the range of the state where only enough voltage is applied to the liquid crystal for the retardation Δ to be half wavelength (e.g., within the range of plus or minus 5%) as to the center-of-gravity wavelength BC of the B-color wavelength band (applied voltage EB), to the state where voltage is applied so that the refractive index anisotropy Δn becomes almost 0 (applied voltage EBO).

With such a configuration, the efficiency of light use can be improved without loss of R-color transmittance which has the longest wavelength band (without loss of the amount of R-color light within the displayed image, or while reducing color balance distortion from the reduction of the amount of R-color light within the displayed image, or while lowering the degree of loss of the amount of light or lowering of the amount of R-color light or of color balance distortion based thereon, within the displayed image). Also, deterioration of color purity can be reduced by shifting the R-color wavelength band toward G (or expanding toward G) to adjust the color balance.

Also, with the present exemplary embodiment, the greatest retardation amount Δmax of the liquid crystal modulator can be set to the R-color center-of-gravity wavelength (e.g., within the range of plus or minus 5%), so the exemplary embodiment is not restricted to cases of using the same liquid crystal modulators of all of the R, G, and B color modulation, and liquid crystal modulators of the same configuration can be used for modulation of R-color and G-color while an adjusting liquid crystal modulator, which differs in configuration from the liquid crystal modulators positioned in the light path of the R- and G-color lights, can be used for the modulation of B-color. Specifically, liquid crystal modulators can be used which apply a half wavelength of phase difference with respect to the B-color center-of-gravity wavelength without about any voltage being applied, and can change the applied voltage up to the state where the refractive index anisotropy Δn with respect to the B-color center-of-gravity wavelength of the liquid crystal modulators becomes almost 0.

Therefore, in at least one example, in order to suppress deterioration of light resistance from short wavelength light with high photon energy, a liquid crystal with high light resistance or various polymers can be used only for the liquid crystal modulators for use with B-color light modulation.

Also for the G-color and B-color modulations liquid crystal modulators with the same configuration can be used. For the R-color modulation, liquid crystal modulators with a differing configuration from the liquid crystal modulators thereof can be used. In such a case, the amount of retardation applied in a state with no voltage applied to the R-color liquid crystal modulators are half wavelength of the R-color light center-of-gravity wavelength RC, and the amount of retardation applied to the G-color light center-of-gravity wavelength GC in a state with no voltage applied to the G-color liquid crystal modulators is a half wavelength of the G-color light center-of-gravity wavelength GC. In this case, these liquid crystal modulators have no voltage applied, and because a phase difference of half wavelength of the center-of-gravity wavelength BC is not applied to the center-of-gravity wavelength BC in this state, for the G-color and B-color common liquid crystal modulators which are positioned in the light path of the B-color light, controls can be placed so that the retardation amount where a predetermined voltage is applied is a half wavelength of the B-color center-of-gravity wavelength BC.

Next, a reflective liquid crystal modulator will be described.

Figure 3:
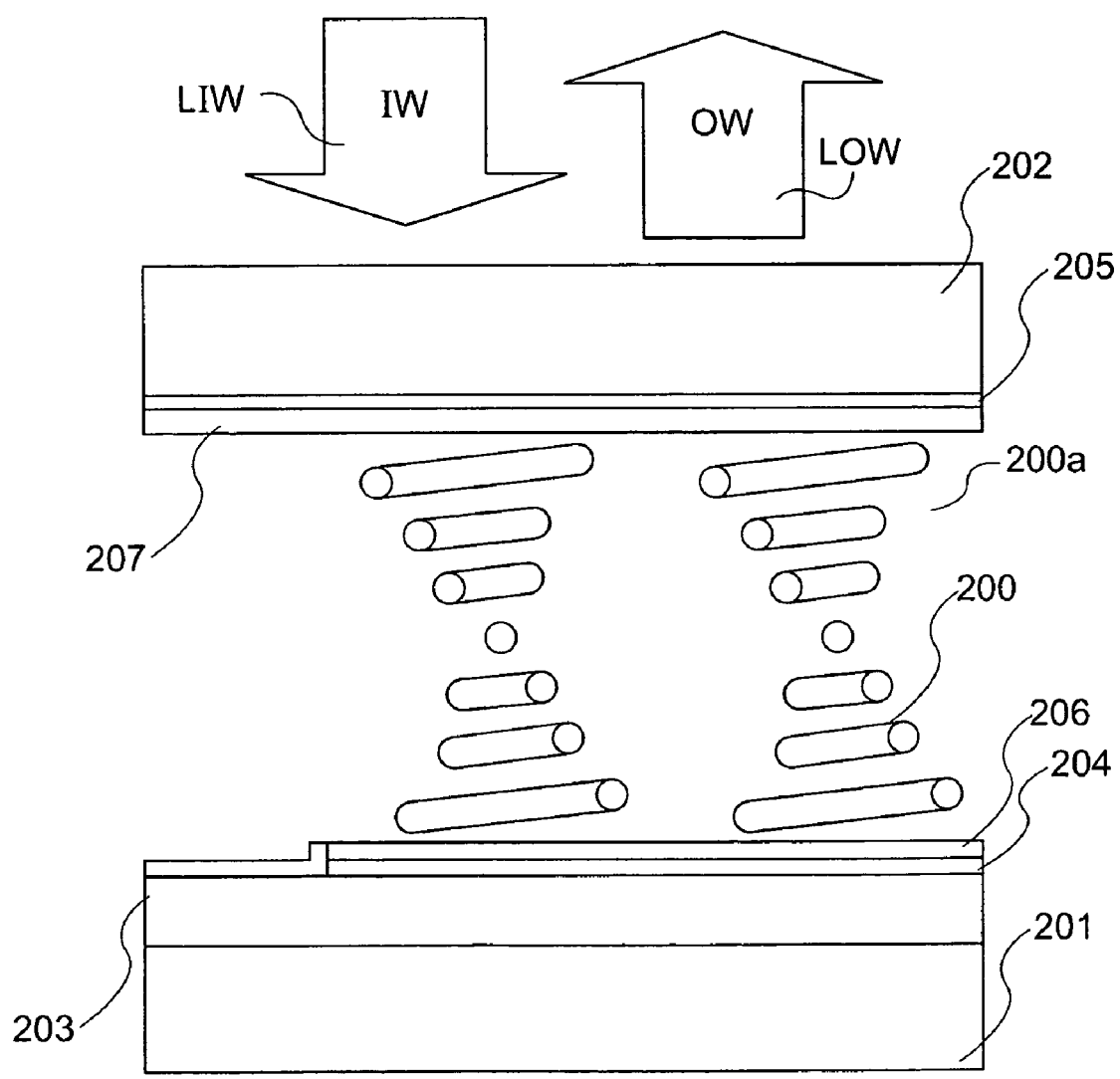
FIG. 3 is a schematic diagram for describing a drive state of a reflective liquid crystal modulator according to the exemplary embodiment.
Figure 4:
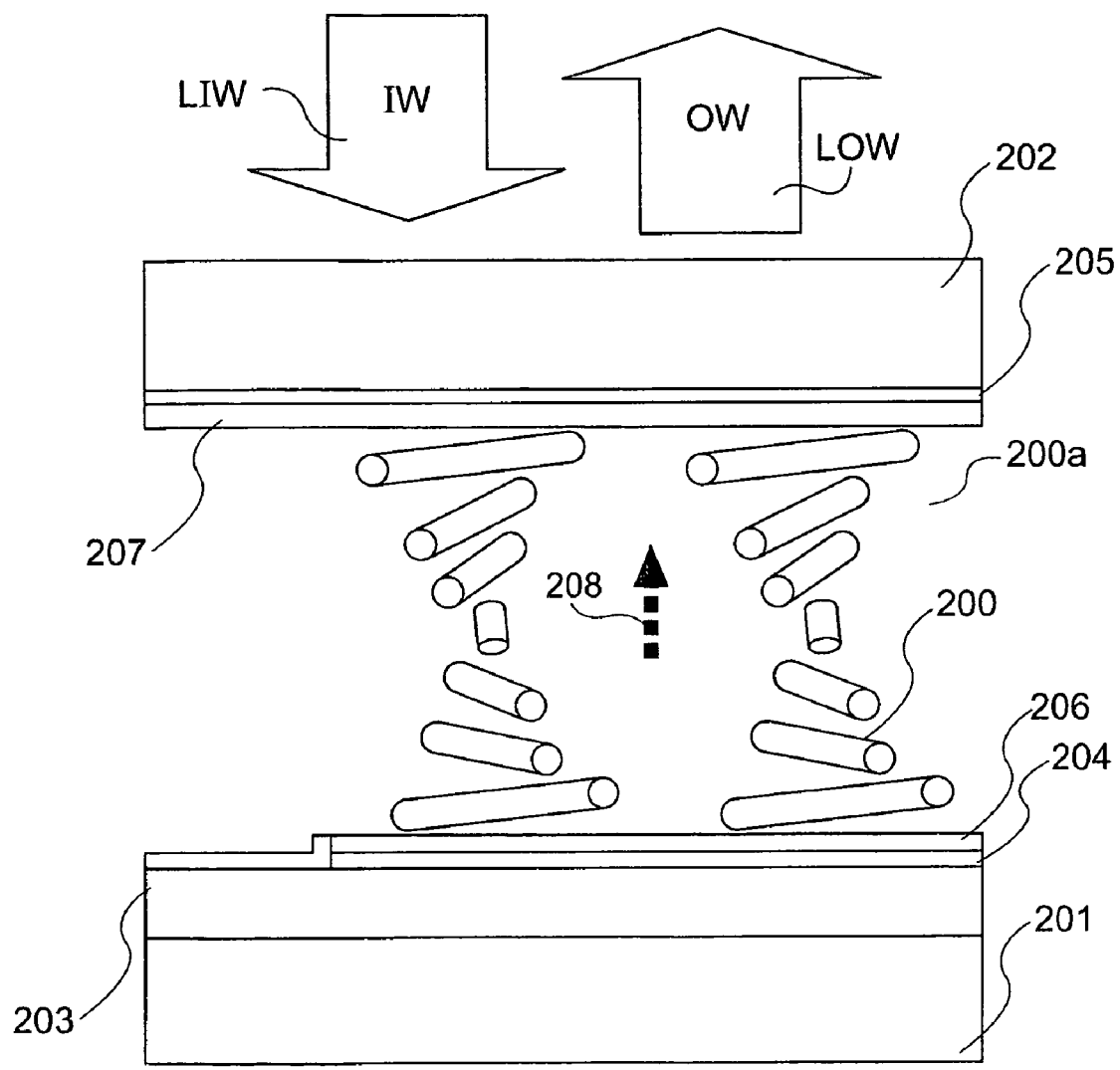
FIG. 4 is a schematic diagram for describing a drive state of a reflective liquid crystal modulator according to the exemplary embodiment.
Figure 5:
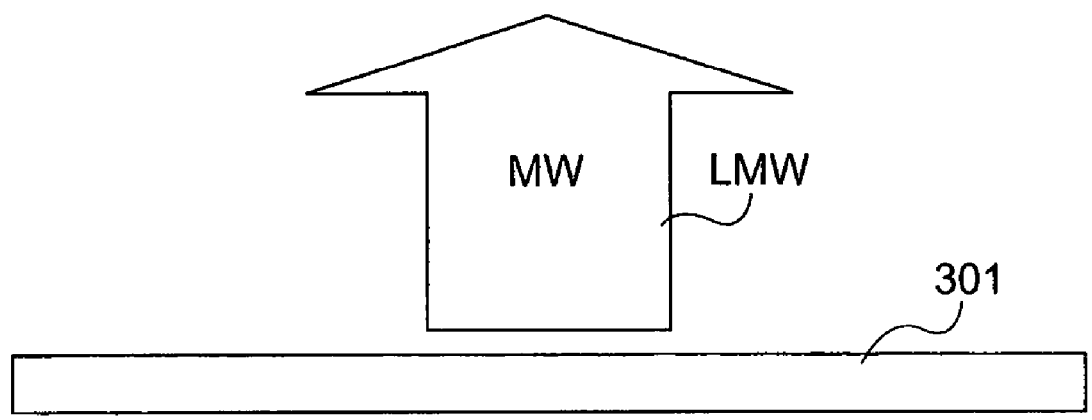
FIG. 5 is a schematic diagram for describing the operation of a transmissive liquid crystal modulator.
Figure 5:
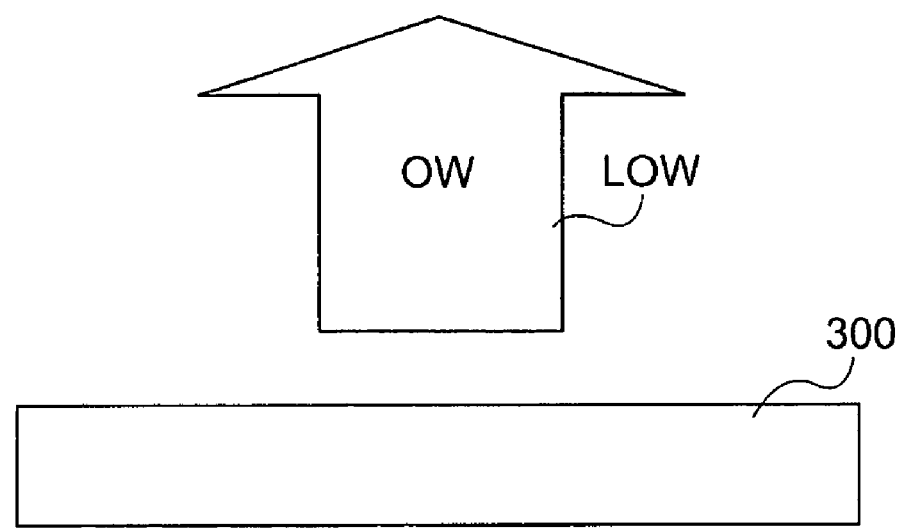
Figure 5:
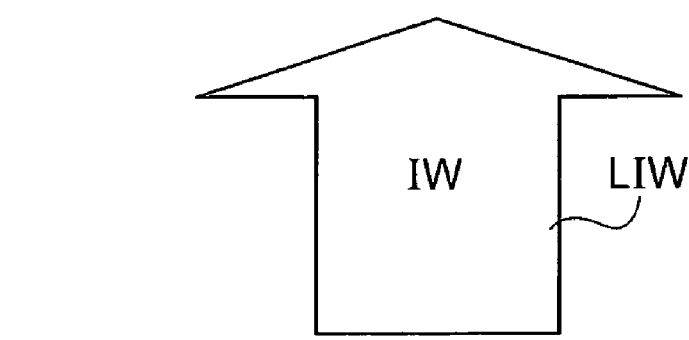
Figure 6:
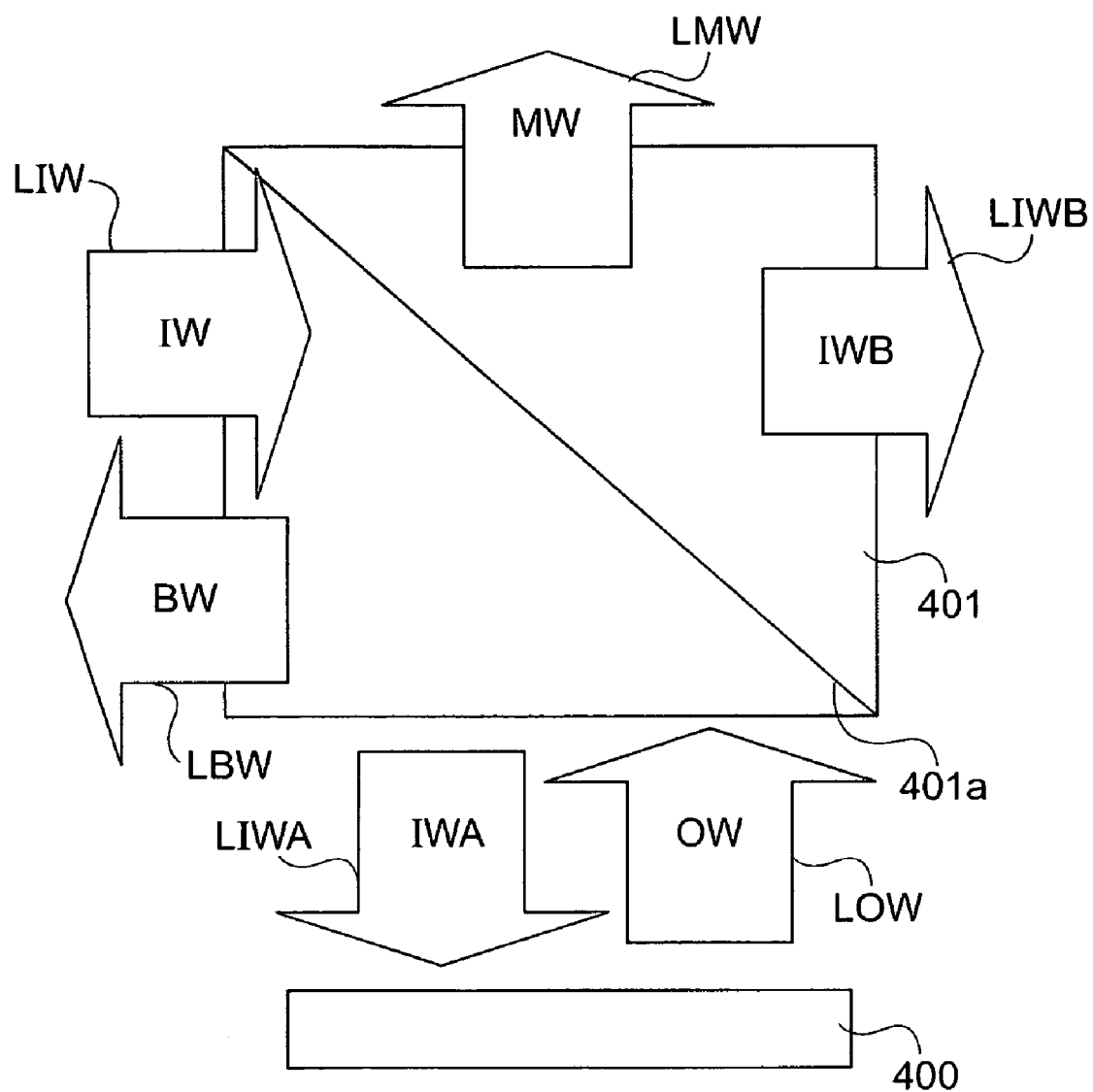
FIG. 6 is a schematic diagram for describing the operation of a reflective liquid crystal modulator.

FIG. 3 is a model diagram of a state of a liquid crystal layer, using a reflective liquid crystal modulator in TN mode, without voltage being applied, and FIG. 4 is a model diagram of a state of a liquid crystal layer, using a reflective liquid crystal modulator in TN mode, with a predetermined amount of voltage being applied.

The reflective liquid crystal modulator comprises a silicon substrate 201, a facing transparent substrate 202, and a liquid crystal layer 200a which contains liquid crystal molecules 200 sealed in between these two substrates.

The silicon substrate 201 comprises: a mirror pixel electrode 204, which has been formed (e.g., from aluminum) and finished to be mirror-like, arranged in a matrix of rows and columns not shown; a liquid crystal oriented film 206 formed of for example a polyimide polymer, and a switching circuit layer 203 containing a switching device 203 formed of a MOSFET for electrically driving the mirror pixel electrode 204; and the mirror pixel electrode 204 which can be configured so as to be individually driven electrically.

Also, the facing transparent substrate 202 (liquid crystal layer side) can be formed of a transparent common electrode 205 formed from for example an ITO (indium tin oxide), and a liquid crystal oriented film 207 formed of for example a polyimide polymer.

Next, the operation of the reflective liquid crystal modulator will be described. In FIG. 3, the light LIW from the light source is cast in the direction of the arrow IW in the diagram as linear polarization with the polarization direction being a 45 degree angle from the oriented direction of the substrate boundary of the liquid crystal molecules 100, via a polarization selecting device not shown. The incident light LIW is divided into two characteristic modes and propagates and reflects at the liquid crystal layer 200a, and is emitted in the direction of the arrow OW in the diagram as light LOW. At this time, retardation $\Delta$ is generated between the two modes in the liquid crystal layer 200a, which is expressed with the following Expression.

$$\Delta = 2s \cdot \Delta n. \tag{7}$$

In Expression (7), d is the thickness of the liquid crystal layer, and $\Delta n$ is the refractive index anisotropy of the liquid crystal layer 200a. Thus, of the light which reflects back from the mirror pixel electrode 204 of the reflective-type liquid crystal modulator, and is emitted therefrom, the reflectivity $R(\lambda)$ of the light with components which are orthogonal to the linear polarization of the incident light LIW is as follows.

If the aperture ratio of the reflective liquid crystal modulators is 100% and the non-polarized reflectivity is 100%, then the reflectivity $R(\lambda)$ of the light emitted in the arrow OW direction as to the retardation $\lambda$ is $$R(\lambda) = 0.5(1 - \cos(2\pi\Delta/\lambda)) \tag{8}$$

Here, $\lambda$ is the wavelength of the incident light. In other words, as with the example of the transmissive liquid crystals, the reflectivity $R(\lambda)$ is dependent on the incident light wavelength $\lambda$, as to the retardation $\Delta$ applied by the liquid crystal devices themselves. When the retardation $\Delta$ is $\lambda/2$, then $R(\lambda)=1$, and the greatest reflection is obtained, and also the situation where the retardation $\Delta$ does not apply any voltage to the liquid crystals, that is to say the situation in FIG. 3 is at its greatest, and the retardation $\Delta$ cannot be increased any further.

FIG. 4 illustrates the state in FIG. 3 with a situation where the electrical field of the dotted line arrow 208 in the diagram is applied between the transparent electrodes 204 and 205.

The liquid crystal molecules 200 are in a state of being slightly tilted in the direction of the liquid crystal layer thickness. By tilting the major axis direction having the molecule refractive index anisotropy of the liquid crystal molecules 200 towards the light reflecting direction, the apparent refractive index anisotropy $\Delta n$ can be decreased as to a horizontal wave. In other words, by applying voltage to the liquid crystal, the state in FIG. 4 shows a state where the retardation $\Delta$ expressed in Expression (7) is decreased compared to the state in FIG. 3.

Thus, in the state shown in FIG. 3 where voltage is not applied to the liquid crystal, the liquid crystal modulators are configured in the thickness d of the liquid crystal layer 200a and the refractive index anisotropy $\Delta n$ of the liquid crystal layer 200a so as to apply retardation $\Delta$ of $\Delta R = RC/2 = d \cdot \Delta n$ of half wavelength as to the wavelength of the center-of-gravity wavelength (central wavelength) RC in the red color wavelength range which has the longest wavelength among the three primary colors.

The liquid crystal panel for red color modulation performs reflective modulation within the range from the state of no voltage applied to the state where voltage is applied so that the refractive index anisotropy $\Delta n$ becomes almost 0. Reflective modulation is performed on the G-color modulation liquid crystal panel, as illustrated in FIG. 4, within the range of the state where only enough voltage is applied to the liquid crystal for the retardation $\Delta$ to be half wavelength as to the center-of-gravity wavelength GC of the G-color wavelength band, to the state where voltage is applied so that the refractive index anisotropy $\Delta n$ becomes almost 0.

Further, reflective modulation can be performed on the B-color modulation liquid crystal panel, within the range of the state where only enough voltage is applied to the liquid crystal for the retardation $\Delta$ to be half wavelength as to the center-of-gravity wavelength BC of the B-color wavelength band, to the state where voltage is applied so that the refractive index anisotropy $\Delta n$ becomes almost 0. Thus, the efficiency of light use can be improved without loss of R-color reflectivity which has the longest wavelength band, and for adjusting the color balance, the R-color wavelength band is shifted to the G-side and thus prevents deterioration of color purity.

Also, as with the example of the transmissive liquid crystal described above, the present exemplary embodiment can set the greatest retardation amount Δmax of the liquid crystal modulators to the red color center-of-gravity wavelength, and therefore the same liquid crystal modulators can be used for modulation of R-color and G-color, not only in the cases using the same liquid crystal modulators of a substantial portion (e.g., all) of the R, G, and B color modulations.

In this instance, there is the advantage wherewith, in order to suppress deterioration of light resistance from short wavelength light with high photon energy, liquid crystal with high light resistance or various polymers can be used exclusively for the liquid crystal modulators for use with B-color light modulation.

Thus, the liquid crystal modulators according to the present exemplary embodiment are positive nematic modulators with TN mode action, and the three liquid crystal modulators are formed with the same construction, and the amount of retardation applied to the liquid crystal modulators when no voltage is applied equates to a half-wavelength of the approximate center wavelength in the light wavelength band with the longest wavelength of the three colored lights. The two liquid crystal modulators which modulate the remaining two colored lights can apply retardation equating to a half-wavelength of the approximate center wavelength of the light wavelength band of each color light, with application of the predetermined voltage.

Now, in the case that the three liquid crystal modulators are formed with the same construction, specifically the construction can be as described below. With an image display device which performs display be synthesizing image light from the three liquid crystal modulators, i.e., a first liquid crystal modulator for modulating the polarization state of a first colored light (e.g., R-color), a second liquid crystal modulator for modulating the polarization state of a second colored light (e.g., G-color) which can have a shorter wavelength than the first colored light, and a third liquid crystal modulator for modulating the polarization state of a third colored light (e.g., B-color) which can have a shorter wavelength than the second colored light, where the three liquid crystal modulators are TN-type liquid crystal modulators. For example, a first voltage can be applied to the first liquid crystal modulator for half-wavelength retardation of the first colored light, a second voltage which is higher than the first voltage can be applied to the second liquid crystal modulator for half-wavelength retardation of the second colored light, and a third voltage which is higher than the second voltage can be applied to the third liquid crystal modulator for half-wavelength retardation of the third colored light. Also, the configuration of an image display device of a same configuration, where the three liquid crystal modulators are TN-type liquid crystal modulators, can be such that the retardation which the second liquid crystal modulator applies to incident light (e.g., first colored light) without applying voltage is less than the retardation which the first liquid crystal modulator applies to incident light (e.g., first colored light) without applying voltage, and the retardation which the third liquid crystal modulator applies to incident light (e.g., first colored light) without applying voltage is less than the retardation which the second liquid crystal modulator applies to incident light (e.g., first colored light) without applying voltage.

In addition to this, with the three liquid crystal modulators according to the present exemplary embodiment, of the three colored light to be modulated, when the liquid crystal modulators which modulate the light in order of shortest wavelength can be defined as liquid crystal modulator B, G, R, the two liquid crystal modulators G and R are formed with the same construction, and the liquid crystal modulator B is formed with a construction differing from the other two liquid crystal modulators G and R. Additionally, the amount of retardation applied to the liquid crystal modulator B when there is no voltage applied equates to a half-wavelength of the approximate center wavelength of the shortest light wavelength band of the three colored lights. Furthermore the amount of retardation applied to the liquid crystal modulator R when there is no voltage applied equates to a half-wavelength of the approximate center wavelength of the longest light wavelength band of the three colored lights, and the retardation applied to the liquid crystal modulator G equating to a half-wavelength of the approximate center wavelength of an intermediate colored light wavelength band is applied according to the predetermined voltage application.

Thus, when the liquid crystal modulators for G and R are of the same construction, and the liquid crystal modulators for B differs from those, specifically the construction can be as described below. For example, with an image display device which performs display by synthesizing image light from the three liquid crystal modulators, i.e., a first liquid crystal modulator for modulating the polarization state of a first colored light, a second liquid crystal modulator for modulating the polarization state of a second colored light, which has a shorter wavelength than the first colored light, and a third liquid crystal modulator for modulating the polarization state of a third colored light which has a shorter wavelength than the second colored light. Where the three liquid crystal modulators are TN-type liquid crystal modulators, the retardation which the first liquid crystal modulator applies to incident light (e.g., first colored light) without applying voltage is about the same as the retardation which the second liquid crystal modulator applies to incident light (e.g., first colored light) without applying voltage, and the retardation which the first and second liquid crystal modulator applies to incident light (e.g., first colored light) without applying voltage is greater than the retardation which the third liquid crystal modulator applies to incident light (e.g., first colored light) without applying voltage.

In addition to this, with the two liquid crystal modulators according to the present exemplary embodiment, the two liquid crystal modulators G and B can be formed with the same construction, and the liquid crystal modulator R can be formed with a construction differing from the other two liquid crystal modulators G and B. Additionally, the amount of retardation applied to the liquid crystal modulator R when there is no voltage applied equates to a half-wavelength of the approximate center wavelength of the light wavelength band with the shortest wavelength of the three colored lights. Furthermore, the amount of retardation applied to the liquid crystal modulator G when there is no voltage applied equates to a half-wavelength of the approximate center wavelength of an intermediate colored light wavelength band of the three colored lights, and the retardation applied to the liquid crystal modulator B equating to a half-wavelength of the approximate center wavelength of the light wavelength band with the shortest wavelength is applied according to the predetermined voltage application.

Thus, an exemplary embodiment where the liquid crystal modulators for B and G are of the same construction, and the liquid crystal modulators for R differs from those, are described below. For example, with an image display device synthesizing image light from the three liquid crystal modulators, comprising a first liquid crystal modulator for modulating the polarization state of a first colored light, a second liquid crystal modulator for modulating the polarization state of a second colored light which has a shorter wavelength than the first colored light, and a third liquid crystal modulator for modulating the polarization state of a third colored light which has a shorter wavelength than the second colored light. The three liquid crystal modulators are TN-type liquid crystal modulators, the retardation which the first liquid crystal modulator applies to incident light (e.g., first colored light) without applying voltage is greater than the retardation which the second liquid crystal modulator applies to incident light (e.g., first colored light) without applying voltage. The retardation which the second liquid crystal modulator applies to incident light (e.g., first colored light) without applying voltage is about the same as the retardation which the third liquid crystal modulator applies to incident light (e.g., first colored light) without applying voltage.

Now, the—"same construction" here has the meaning that for the same wavelengths of light without voltage being applied, about the same retardation (phase difference) is applied, and about the same retardation is applied to the same wavelengths in a state with a predetermined voltage applied. In other words, even if the outward appearance is slightly different, the construction can be the same.

The present exemplary embodiment is not restricted to the above description. For example, the liquid crystal modulators R, G, and B can all have structures different one from another. That is to say, the liquid crystal modulators can each be configured to provide different retardation (optical path difference) to incident light (light of any wavelength is permissible, for example light within the visible light range). Specifically, a configuration is made where retardation (optical path difference) which the liquid crystal modulator R provides to incident light (light of any wavelength is permissible, for example light within the visible light range) without voltage being applied is greater than the retardation which the liquid crystal modulator G provides to incident light without voltage being applied. Retardation which the liquid crystal modulator G provides to incident light without voltage being applied is greater than the retardation which the liquid crystal modulator B provides to incident light without voltage being applied. Note that "retardation" as used here refers to the optical path difference of two light rays of which the polarization directions are mutually orthogonal, and even if the optical path difference is about the same (structure is about the same), difference in the wavelength of the light to which the optical path difference is provided consequently results in difference in the provided phase difference.

In this case, the phase difference which the liquid crystal modulator R provides to the R colored light (representative wavelength of R colored light or wavelength region of R colored light) without voltage being applied, the phase difference which the liquid crystal modulator G provides to the G colored light (representative wavelength of G colored light or wavelength region of G colored light) without voltage being applied, and the phase difference which the liquid crystal modulator B provides to the B colored light (representative wavelength of B colored light or wavelength region of B colored light) without voltage being applied, are about the same (e.g., one can be 95% or more or 105% or less of another, or for example 98% or more or 102% or less), with the phase difference being generally half-wave. However, in the event of actually providing half-wave phase difference to the colored light, minute voltage can be applied to the liquid crystal modulators.

Thus, the configuration features of the image display device according to the present exemplary embodiment are as follows.

The image display device comprises a first liquid crystal modulator for modulating the polarization state of a first colored light, a second liquid crystal modulator for modulating the polarization state of a second colored light which has a shorter wavelength than the first colored light, and a third liquid crystal modulator for modulating the polarization state of a third colored light which has a shorter wavelength than the second colored light, and synthesizes image light from the three liquid crystal modulators and displays this.

The features of at least one exemplary embodiment thereof are that:

the three liquid crystal modulators are TN-type liquid crystal modulators, in order to apply a half-wavelength retardation (retardation equivalent to half-wave length of the first colored light) to the first colored light, the first voltage is applied to the first liquid crystal modulator. In order to apply a half-wavelength retardation (retardation equivalent to half-wave length of the second colored light) to the second colored light, a second voltage which is greater than the first voltage is applied to the second liquid crystal modulator. In order to apply a half-wavelength retardation (retardation equivalent to half-wave length of the third colored light) to the third colored light, a third voltage which is greater than the second voltage is applied to the third liquid crystal modulator, that is to say, in this case, the three liquid crystal modulators are about the same structure.

the retardation which the second liquid crystal modulator applies to incident light (e.g., first colored light) without applying voltage is less than the retardation which the first liquid crystal modulator applies to incident light (e.g., first colored light) without applying voltage, and the retardation which the third liquid crystal modulator applies to incident light (e.g., first colored light) without applying voltage is less than the retardation which the second liquid crystal modulator applies to incident light (e.g., first colored light) without applying voltage, that is to say, in this case, the three liquid crystal modulators all are of different structures.

the retardation which the first liquid crystal modulator applies to incident light (e.g., first colored light) without applying voltage is about the same as the retardation which the second liquid crystal modulator applies to incident light (e.g., first colored light) without applying voltage, and the retardation which the first and-second liquid crystal modulator applies to incident light (e.g., first colored light) without applying voltage is greater than the retardation which the third liquid crystal modulator applies to incident light (e.g., first colored light) without applying voltage, that is to say, in this case, the structure of the second liquid crystal modulator and the structure of the third liquid crystal modulator are the same, while the structure of the first liquid crystal modulator is different from these structures.

the retardation which the first liquid crystal modulator applies to incident light (e.g., first colored light) without applying voltage is greater than the retardation which the second liquid crystal modulator applies to incident light (e.g., first colored light) without applying voltage, and the retardation which the second liquid crystal modulator applies to incident light (e.g., first colored light) without applying voltage is about the same as the retardation which the third liquid crystal modulator applies to incident light (e.g., first colored light) without applying voltage, that is to say, in this case, the structure of the first liquid crystal modulator and the structure of the second liquid crystal modulator are the same, while the structure of the third liquid crystal modulator is different from these structures.

a first voltage is applied to the first liquid crystal modulator for half-wavelength retardation of the first colored light, a second voltage which is higher than the first voltage is applied to the second liquid crystal modulator for half-wavelength retardation of the second colored light, a third voltage which is higher than the second voltage is applied to the third liquid crystal modulator for half-wavelength retardation of the third colored light.

Thus, a liquid crystal projection-type image display device with an image display with a bright, wide color range can be achieved.

Figure 8:
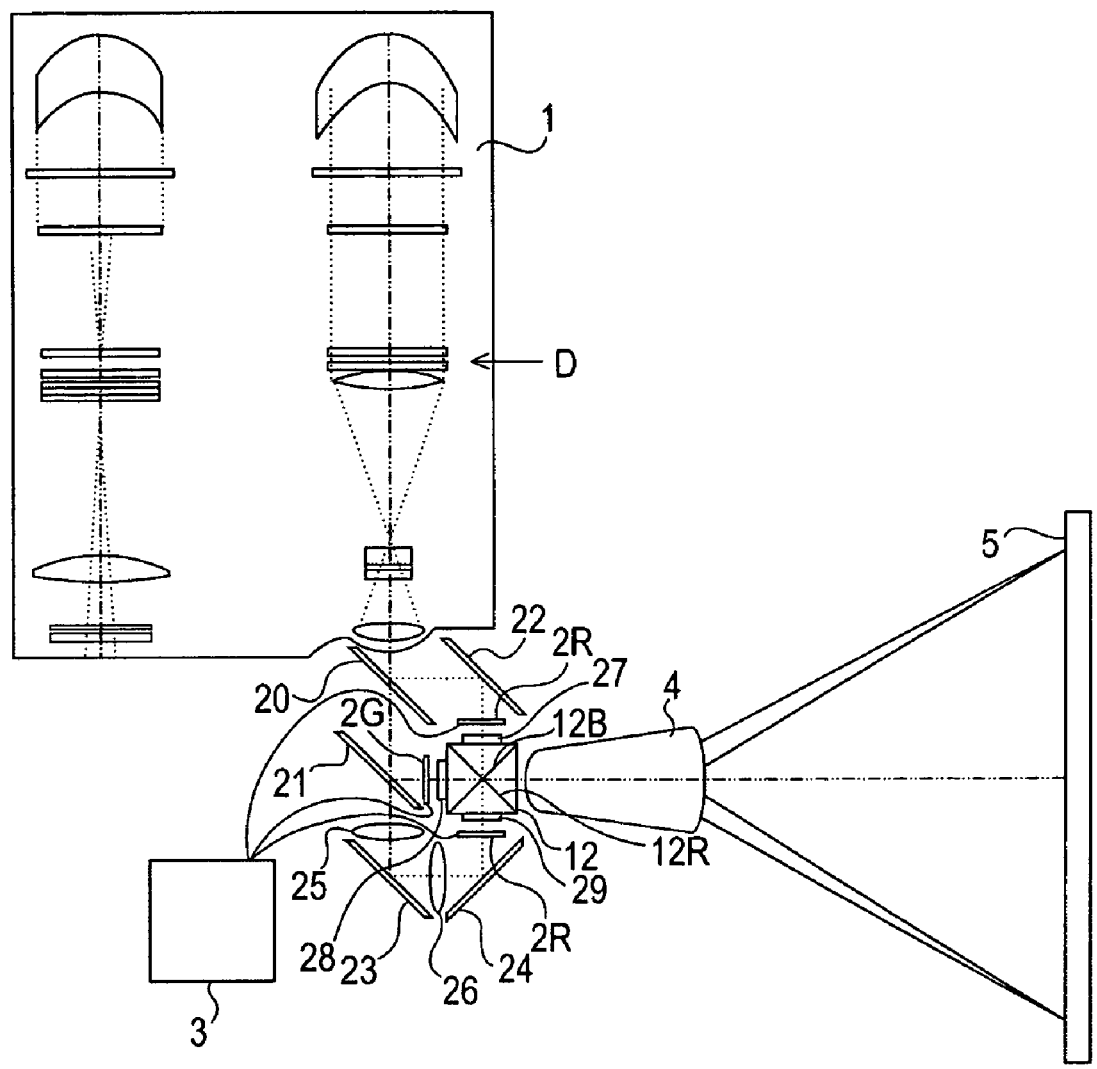
FIG. 8 is a schematic diagram of the main portions of a projection-type display device using a transmissive liquid crystal modulator according to an exemplary embodiment of the present invention.

Next, a first exemplary embodiment of the projection-type display device according to at least one exemplary embodiment will be described based on FIG. 8. FIG. 8 is a cross-sectional view of a primary optical system comprising the first exemplary embodiment of the projection-type display device.

In FIG. 8, a drive signal from a light modulator panel driver 3, which converts an external video input signal not shown into a light modulation panel drive signal, independently controls each of a red light modulation panel 2R, a green light modulation panel 2G, and a blue light modulation panel 2B, which are formed from transmissive liquid crystal modulators via the solid lines in the diagram.

At this time, the voltage to be applied to each light modulator panel 2R, 2G, and 2B are controlled as described above.

On one hand, illumination which is a linearly polarized wave in the vertical direction in the diagram from an illumination device 1 (side view is shown horizontally) first deflects a red color component R with a dichroic mirror 20 for separating the red-cyan wavelength band, which reflects the color red and transmits the color cyan (green and blue), and the deflected red color R is guided to the red light modulation panel 2R with a total reflection mirror 22. On the other hand, cyan color component transmitted and separated by the dichroic mirror 20 for separating and transmitting the red-cyan wavelength band deflects a green color component of the yellow component of the color cyan with a dichroic mirror 21 for separating the yellow-blue wavelength band, which reflects the color yellow and transmits the color blue B, and the deflected green color G is guided to the green light modulation panel 2G. Also, the blue color component B transmitted and separated by the dichroic mirror 21 for yellow-blue wavelength band is guided to the blue light modulation panel 2B with total reflection mirrors 23 and 24. At this time, in order to extend the light path length, a cats-eye optical system using Fourier transformation lenses 25 and 26 transfers the pupil to the light modulation panel 2B.

With the above illumination configuration, the red light modulation panel 2R, the green light modulation panel 2G, and the blue light modulation panel 2G are illuminated.

On the other hand, the linearly polarized illumination which is polarized in the vertical direction in the diagram with the red light modulation panel 2R, the green light modulation panel 2G, and the blue light modulation panel 2B, which are modulated according to the video signal, have retardation applied to the polarized light thereof according to the modulation state of the pixels arranged in the red light modulation panel 2R, the green light modulation panel 2G, and the blue light modulation panel 2B.

Of the light flux modulated in the red light modulation panel 2R, the green light modulation panel 2G, or the blue light modulation panel 2B, affixed to the incidence surface for each color of the cross dichroic prism 12, the modulated light components polarized in the vertical direction in the diagram by a red analyzer 27, a green analyzer 28, or a blue analyzer 29 respectively, are transmitted, and the modulated light components polarized in the horizontal direction in the diagram are absorbed in the analyzers and disappear as heat (note that an analyzer is an optical device which shields light of a different polarization state from that of the image light so as to not enter the projection optical system, examples thereof being polarization plates, beam splitters). Hereafter the modulated light components polarized in the vertical direction in the diagram which have been modulated with each color are cast in the cross dichroic prism 12.

The cross dichroic prism 12 can be configured with a red-reflective dichroic wavelength band separation film 12R for the S-polarized light, for reflecting the red color R and transmitting the green color G and the blue color B, and a blue-reflective dichroic wavelength band separation film 12B for reflecting the blue color B and transmitting the green color G and the red color R, which can be arranged in a cross pattern.

Therefore green has the feature of independently transmitting the red-reflective dichroic wavelength band separation film 12R and the blue-reflective dichroic wavelength band separation film 12B. By using the cross dichroic prism 12, the image information light of the red color R is deflected in the direction of the projection lens 4 by the red-reflective dichroic wavelength band separation film 12R, the image information light of the blue color B is deflected in the direction of the projection lens 4 by the blue-reflective dichroic wavelength band separation film 12B, and the image information light of the green color G advances in the direction of the projection lens 4 without being deflected.

However, the multiple pixels arranged on the red light modulation panel 2R, green light modulation panel 2G, and blue light modulation panel 2B can be adjusted or mechanically or electrically compensated so as to have predetermined pixels overlap relative to each other with a predetermined degree of precision.

Next, the lights R, G, B which have been modulated as multiplexed colored light are captured by the entrance pupil of the projection lens 4 in that state, and the light modulation face of each of the red light modulation panel 2R, green light modulation panel 2G, and blue light modulation panel 2G and the light diffusion face of a light diffusion screen 5 can be arranged in optically coupled relationships by the projection lens 4, and therefore are transferred to the light diffusion screen 5, and the image according to the video signal is displayed on the light diffusion screen 5.

Figure 9:
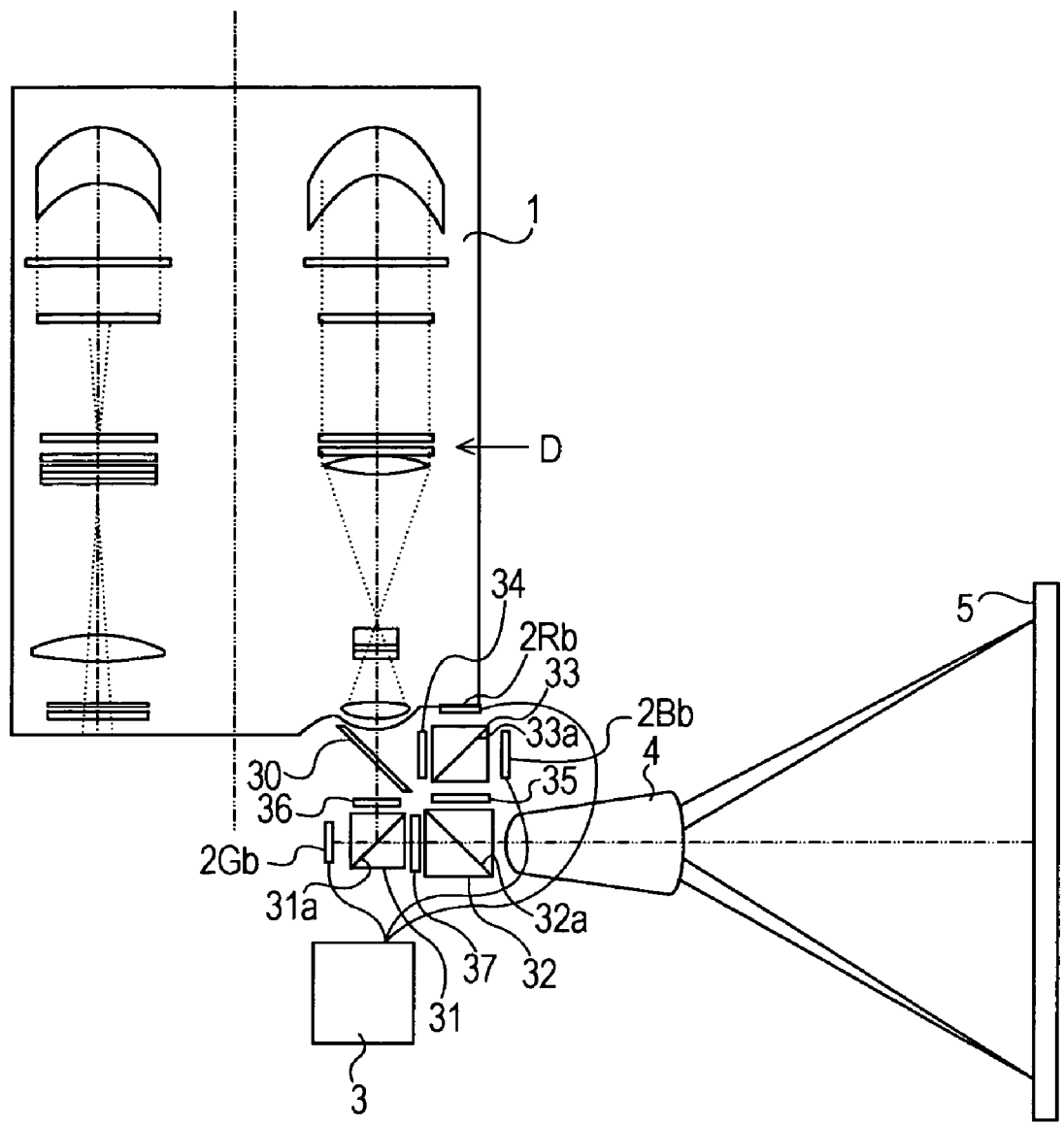
FIG. 9 is a schematic diagram of the principal portions of a projection-type display device using a reflective liquid crystal modulator according to an exemplary embodiment of the present invention.

A second exemplary embodiment of the projection-type display device according to the present exemplary embodiment will be described based on FIG. 9. FIG. 9 is a cross-sectional view of the main optical system comprising the second exemplary embodiment of the projection-type display device.

In FIG. 9, a drive signal from a light modulation panel drive 3 which converts an external video input signal, not shown, to a light modulation panel drive signal independently controls each of the red light modulation panel 2Rb, green light modulation panel 2Gb, and blue light modulation panel 2Bb which are formed of reflective liquid crystal modulators via the solid line in the diagram, and on one hand. Illumination which is a linearly polarized wave in the vertical direction in the diagram from an illumination device 1 (side view is shown horizontally) first deflects a magenta color component R with a dichroic mirror 30 for separating the magenta-green wavelength band, which reflects the color magenta (red and blue) and transmits the color green G, and the deflected color magenta transits the blue cross color polarizer 34 applying half-wavelength retardation to the blue polarized light. Thus, the blue color component B which is linearly polarized in the horizontal direction in the diagram and the red color component R which is linearly polarized in the vertical direction in the diagram are created, and next, are cast into a polarizing beam splitter 33. The blue color component B which is linearly polarized in the horizontal direction in the diagram transmits the polarization separation film 33a because of a P-polarizing wave, and is guided to the blue light modulation panel 2B. The red color component R, which is linearly polarized in the vertical direction in the diagram, reflects off the polarization separation film 33a because of a S-polarizing wave, and is guided to the red light modulation panel 2R.

On the other hand, the green color component G, which is transmitted and separated by the magenta-green wavelength band separation dichroic mirror 30, transits a dummy glass 36 for the purpose of correcting the light path, and next is cast into a polarizing beam splitter 31. The green color component G which is linearly polarized in the vertical direction in the diagram reflects off the polarization separation film 31a because of a S-polarizing wave, and is guided to the green light modulation panel 2G.

With the above illumination configuration, the red light modulation panel 2R, green light modulation panel 2G, and blue light modulation panel 2G are illuminated.

On the other hand, the light which illuminates each of the light modulation panels 2R, 2G, and 2B with the red light modulation panel 2R, green light modulation panel 2G, blue light modulation panel 2G which are modulated according to the video signal have retardation applied to the polarized light thereof according to the modulation state of the pixels arranged in the red light modulation panel 2R, green light modulation panel 2G, and blue light modulation panel 2B.

The polarized light components, in the same direction as the illumination, return to the light source lamp side, following the light path which approximately turns back the illumination light path. The polarized light components, at right angles to the polarization direction of the illumination, includes the modulated light by the red light modulation panel 2R in the horizontal direction in the diagram, and transits the polarization separation film 33a because of a P-polarizing wave, and transits a red cross color polarized light 35 which applies half-wavelength retardation to the red polarized light. Then, the polarized light components are converted to a red color component R which is linearly polarized in the vertical direction in the diagram, and next is cast into a polarizing beam splitter 32, and the red color component R which is linearly polarized in the vertical direction in the diagram reflects off the polarization separation film 32a because of a S-polarizing wave, and is deflected in the direction of the projection lens 4.

The modulated light by the blue light modulation panel 2B is polarized so that the polarization direction is in the vertical direction in the diagram, and reflects off the polarization separation film 33a of the polarizing beam splitter 33 because of a S-polarizing wave. The modulated light from the blue light modulation panel then transits without any action by a red cross color polarizer 35 which applies the half-wavelength retardation to the red color R polarized light, and next is cast into a polarizing beam splitter 32, and the blue color component B which is linearly polarized in the vertical direction in the diagram reflects off the polarization separation film 32a because of a S-polarizing wave, and is deflected in the direction of the projection lens 4.

The modulated light by the green light modulation panel 2G is polarized so that the polarization direction is in the horizontal direction in the diagram, and transmits the polarization separation film 32a of the polarizing beam splitter 31 because of a P-polarizing wave. The modulated light by the green light modulation panel then transits a dummy glass 37 for the purpose of correcting the light path, and next is cast into the polarizing beam splitter 32, and the green color component G, which is linearly polarized in the horizontal direction in the diagram, transmits the polarization separation film 32a because of a P-polarizing wave, and is guided in the direction of the projection lens 4. However, the multiple pixels arranged on the red light modulation panel 2R, green light modulation panel 2G, and blue light modulation panel 2B are adjusted or mechanically or electrically compensated so as to have predetermined pixels overlap relative to each other with a predetermined degree of precision.

Next, the lights R, G, B which have been modulated as multiplexed colored light are captured by the entrance pupil of the projection lens 4 in this state, and since the light modulation face of each of the red light modulation panel 2R, green light modulation panel 2G, and blue light modulation panel 2G and the light diffusion face of a light diffusion screen 5 can be arranged in an optically cooperative relationship by the projection lens 4, the multiplexed colored light is transferred to the light diffusion screen 5, and the image according to the video signal is displayed on the light diffusion screen 5.

As described above, according to the various exemplary embodiments, liquid crystal modulators (modulation liquid crystal panels) in the three primary colors do not need to be separately formed individual items, and a liquid crystal projection-type image display device with a bright, wide color range can be provided easily without loss of efficiency of use of the red color light which has the longest wavelength or the green color light.

With the exemplary embodiments described above, liquid crystal modulators which apply approximately half-wavelength retardation when no voltage is applied have been described, but the present invention is not restricted to these. For example, a liquid crystal modulation configuration can be used where there is about no retardation in a state with no voltage applied, and retardation is only applied to incident light when voltage is applied. In this case, with a liquid crystal display device using transmittance liquid crystal modulators (a liquid crystal projector), if the polarization direction aligned by the liquid crystal modulators (the polarization direction of transmittance of the polarization substrate on the incident side of the liquid crystal modulators) and the polarization direction of transmittance of the polarization substrate on the emitting side of the liquid crystal modulators are parallel, the display is white where there is no voltage applied, and conversely, with a transmissive type liquid crystal projector, if the polarization direction of transmittance of the polarization substrate on the incident side of the liquid crystal modulators and the polarization direction of transmittance of the polarization substrate on the emitting side of the liquid crystal modulators are perpendicular, the display is black where there is no voltage applied. Also, with a liquid crystal display using reflective liquid crystal modulators (liquid crystal projector), in the event a polarizing beam splitter is positioned in the position which corresponds to the liquid crystal modulators, the display is black where there is no voltage applied. However, even in such an event, if a quarter-wavelength substrate is appropriately positioned between the reflective liquid crystal modulators and the polarizing beam splitter, the display can be white where there is no voltage applied.

In other words, the present exemplary embodiment can be applicable to various liquid crystal display devices, for example regardless of whether a liquid crystal display device which displays white where there is no voltage applied, or a liquid crystal display device which displays black where there is no voltage applied, or a liquid crystal display device which uses reflective liquid crystal modulators, or a liquid crystal display device using transmissive liquid crystal modulators with which the polarization direction has about no change where there is no voltage applied, or a liquid crystal display device using liquid crystal modulators which rotate the polarization direction 90 degrees where there is no voltage applied.

This application claims priority from Japanese Patent Application No. 2005-074668 filed Mar. 16, 2005, which is hereby incorporated by reference herein in its entirety.

What is claimed is:

1. An image display device comprising:
   a first TN liquid crystal modulator for modulating the polarization state of a first colored light;
   a second TN liquid crystal modulator for modulating the polarization state of a second colored light which has a shorter wavelength than the first colored light;
   a third TN liquid crystal modulator for modulating the polarization state of a third colored light which has a shorter wavelength than the second colored light; and
   an optical system for synthesizing the image light which is emitted from the three liquid crystal modulators,
   wherein a first voltage is applied to the first liquid crystal modulator for providing the first colored light with about a half-wavelength phase difference, and wherein a second voltage which is higher than the first voltage is applied to the second liquid crystal modulator for providing the second colored light with about a half-wavelength phase difference, and wherein a third voltage which is higher than the second voltage is applied to the third liquid crystal modulator for providing the third colored light with about a half-wavelength phase difference.

* * * * *